(12) United States Patent
Su et al.

(10) Patent No.: US 12,212,794 B2
(45) Date of Patent: Jan. 28, 2025

(54) BIOMETRIC AUTHENTICATION OF STREAMING CONTENT

(71) Applicant: INTERNATIONAL BUSINESS MACHINES CORPORATION, Armonk, NY (US)

(72) Inventors: Jun Su, Beijing (CN); Hamid Majdabadi, Ottawa (CA); Jeremy R. Fox, Georgetown, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/058,309

(22) Filed: Nov. 23, 2022

(65) Prior Publication Data

US 2024/0171794 A1 May 23, 2024

(51) Int. Cl.
*H04N 21/258* (2011.01)
*H04N 21/24* (2011.01)
*H04N 21/4415* (2011.01)

(52) U.S. Cl.
CPC ... *H04N 21/25875* (2013.01); *H04N 21/2407* (2013.01); *H04N 21/4415* (2013.01)

(58) Field of Classification Search
None
See application file for complete search history.

(56) References Cited

U.S. PATENT DOCUMENTS

| 7,610,597 | B1 | 10/2009 | Johnson |
| 7,986,816 | B1 | 7/2011 | Hoanca |
| 9,762,961 | B2 | 9/2017 | Aronzon |
| 10,031,577 | B2 | 7/2018 | McLean |
| 11,153,646 | B2 | 10/2021 | Shetty |

(Continued)

FOREIGN PATENT DOCUMENTS

CA          2902093 A1 *  2/2016 ............. G06F 21/32

OTHER PUBLICATIONS

Author Unknown, "Films That Inspire Critical Reflection on the Social, Political, & Cultural Impact of American Mass Media", Media Education Foundation, https://www.mediaed.org/, Accessed Sep. 29, 2022. pp. 1-7.

(Continued)

*Primary Examiner* — Omar S Parra
(74) *Attorney, Agent, or Firm* — Steven M. Bouknight

(57) ABSTRACT

A computer-implemented method, a computer system and a computer program product control access to streaming media content. The method includes identifying the streaming media content on a content server for transmission to a user. The method also includes acquiring a biometric marker from the user using a computer vision system. The method further includes obtaining a profile for the user from a server, where the profile of the user includes a biometric signature and permissible content. In addition, the method includes determining that the biometric marker matches the biometric signature in the profile for the user. The method also includes determining that the streaming media content matches the permissible content in the profile for the user. Lastly, the method includes transmitting the streaming media content to a device, where the device is associated with the user.

15 Claims, 2 Drawing Sheets

FIG. 2

(56) References Cited

U.S. PATENT DOCUMENTS

| | | | |
|---|---|---|---|
| 11,803,250 B2* | 10/2023 | Siu | H04N 21/4532 |
| 2018/0288115 A1 | 10/2018 | Asnis | |
| 2020/0112759 A1* | 4/2020 | Alameh | H04N 21/42202 |
| 2022/0036405 A1 | 2/2022 | Publicover | |

OTHER PUBLICATIONS

Corcoran et al., "Biometric Access Control for Digital Media Streams in Home Networks", IEEE Transactions on Consumer Electronics, https://www.researchgate.net/publication/3183261_Biometric_Access_Control_for_Digital_Media_Streams_in_Home_Networks, Sep. 2007, pp. 1-10.

Ma et al., "Eye-2-1: Eye-Tracking for Just-in-Time Implicit User Profiling", 2017 IEEE 2nd International Conference on Signal and Image Processing, https://ieeexplore.ieee.org/abstract/document/8124555, © 2017, pp. 311-315.

Mehrubeoglu et al., "Real-time eye tracking for password authentication", https://ieeexplore.ieee.org/document/8326302, 2018 IEEE International Conference on Consumer Electronics (ICCE), Accessed Sep. 28, 2022, pp. 1-4.

Shokishalov et al., "Applying Eye Tracking in Information Security", Elsevier, ScienceDirect, Procedia Computer Science 150 (2019) 347-351, https://www.sciencedirect.com/science/article/pii/S1877050919304089#:~: text=Eye%20tracking%20technology%20is%20widely,interest)%2C%20salient%20picture%20components.

Song et al., "EyeVeri: A Secure and Usable Approach for Smartphone User Authentication", https://sctracy.github.io/chensong.github.io/pdf/infocom16.pdf, IEEE INFOCOM 2016—The 35th Annual IEEE International Conference on Computer Communications, Accessed Sep. 29, 2022, pp. 1-10.

"Media Violence: Facts & Statistics", Media Education Foundation, 2005, 1 page, http://www.mediaed.org/handouts/ChildrenMedia.

* cited by examiner

BIOMETRIC AUTHENTICATION OF STREAMING CONTENT

BACKGROUND

Embodiments relate generally to the field of streamed media content, and more specifically, to applying access control to streamed media content.

In today's commercial entertainment environment, media streaming services may provide media to end users without requiring users to download that media to a local storage medium. Rather, the media may be delivered to the user over a network from a remote storage medium of the media stream service provider, with the media stream typically configured such that the media is compressed, e.g., using audio coding format or video coding format, and routed through a content delivery network, e.g., using a transport protocol, such as HTTP, to a user. The rise in subscription media streaming services has given consumers seemingly endless media options. However, due to the sheer size of the media repositories and the difficulty of applying access control to the multitude of streaming content, inappropriate content can very easily be consumed by users that should not have access, e.g., children watching adult-rated content, or by users wishing to limit consumption of explicit or violent media. As a result, media streaming service providers have devised a variety of solutions to limit access to streaming media content, using both centralized methods and by allowing users to customize filtering of content.

SUMMARY

An embodiment is directed to a computer-implemented method for controlling access to streaming media content. The method may include identifying the streaming media content on a content server for transmission to a user. The method may also include acquiring a biometric marker from the user using a computer vision system. The method may further include obtaining a profile for the user from a server, where the profile for the user includes a biometric signature and permissible content. In addition, the method may include determining that the biometric marker matches the biometric signature in the profile for the user. The method may also include determining that the streaming media content matches the permissible content in the profile for the user. Lastly, the method may include transmitting the streaming media content to a device, wherein the device is associated with the user.

In another embodiment, the method may include monitoring the streaming media content that is transmitted to the device and updating the profile for the user based on transmitted content.

In a further embodiment, the method may include determining that the profile for the user is a group profile, where the group profile includes an administrator. In this embodiment, the method may also include transmitting a prompt to the administrator to approve access to the streaming media content and transmitting the streaming media content to the device when the administrator approves.

In yet another embodiment, a machine learning model that predicts desired streaming media content based on personal characteristics and content specifications may be used to determine the permissible content included in the profile for the user.

In another embodiment, the computer vision system may use eye tracking and gaze detection algorithms to acquire the biometric marker.

In a further embodiment, prior to the identifying the streaming media content on the content server, the method may include determining that the profile for the user does not include the biometric signature. In this embodiment, the method may further include acquiring the biometric marker using the computer vision system and adding the biometric marker to the profile for the user as the biometric signature.

In yet another embodiment, the profile for the user may include characteristics selected from a group consisting of: a user interest in the streaming media content, a schedule of user activities, a streaming media content rating, a user state of health, and a gaming profile.

In addition to a computer-implemented method, additional embodiments are directed to a system and a computer program product for controlling access to streaming media content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
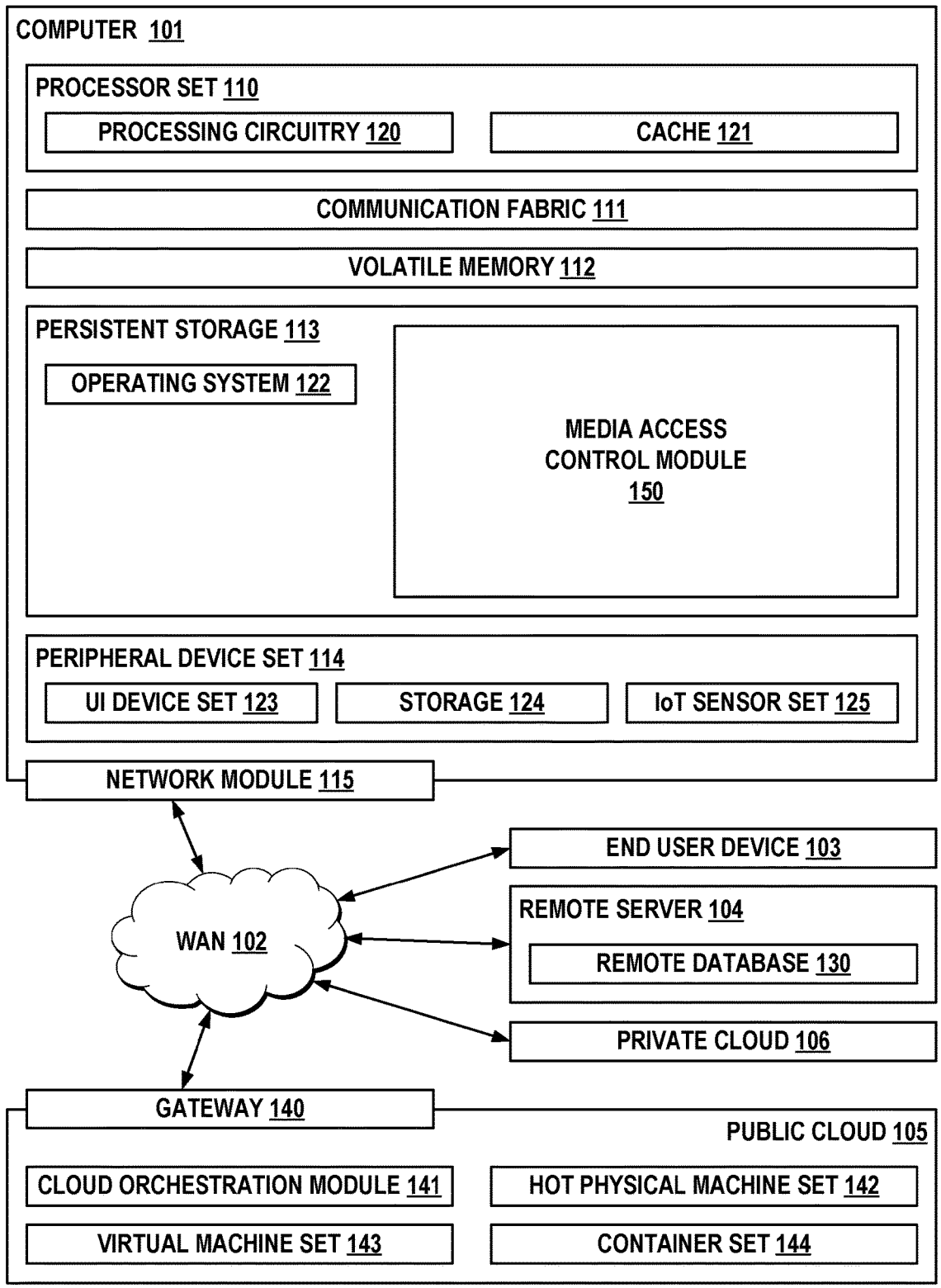
FIG. 1 depicts a block diagram of an example computer system in which various embodiments may be implemented.

In today's home entertainment environment, management of streaming media content in a household or other group environment, including understanding and tracking the desires and preferences of users with respect to streaming media content, may be highly challenging due to the multitude of streaming media content that may be available to a user. Users may be compelled to browse or search through a vast collection of streaming media content to find or follow the content of interest. While many content providers may suggest material based on a prediction of interest, the provider's predictions may not reflect the user's actual interests or may not capture dynamic shifts in schedule and inclination. In such a scenario, users may be unable to explore the streaming media content being offered by the provider with ease. As described herein, streaming media content may refer to any content that may be played by a device, including traditional home entertainment such as movies or television shows and also gaming content, which may be live playing between remote end users but may also be videos or other content transmitted between a user and a gaming server or other remote storage.

In conjunction with the management of streaming content, parental control solutions for preventing access to inappropriate content by minors may also be quite cumbersome. Most online streaming, gaming, and video on demand providers may offer solutions such as password protection, IP/domain limits, geo-blocking access restrictions, and rudimentary in-product profiles to track viewing history and interest. These options may require manual configuration by an administrator, e.g., a parent or guardian, due to the amount of content that may be available and the constantly changing updates and additions made to gaming and media devices. This manual configuration may demand constant monitoring of all posted media to match the preferences of the administrator with respect to each family member. It may also be time-consuming to require a response from an administrator each time that streaming media content is requested by a user.

Therefore, it may be useful to provide an automated method or system of media streaming content authentication that may use a computer vision system with a camera to acquire a biometric marker from a user, e.g., perform eye tracking and Gaze-based biometrics authentication of users, continuously and in real-time and assess the biometric marker against a signature in a user profile to provide access control to streaming media content on demand. The user profile may also include user interests and preferences for streaming media content correlated with time-based content, a user's schedule, e.g., vacation and business trips, user's state of health, content follow-ups and interest, content rating with and without time-of-day correlation and any other customizable media and gaming profile identification. Such a method or system may automate the process of authenticating a user, as well as learn the preferences and habits of user and administrators (in the case of a managed group profile). This may improve the ability of both streaming media content providers and individual users to manage access to streaming media content that may be entering homes and offices and other environments.

Referring to FIG. 1, computing environment 100 contains an example of an environment for the execution of at least some of the computer code involved in performing the inventive methods, such as media access control module 150. In addition to media access control module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and media access control module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in media access control module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in media access control module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated userspace instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to control access to streaming media content by using a user profile in tandem with biometric authentication of a user requesting the streaming media content. In particular, streaming media content may be identified for transmission to a requesting user. A biometric marker may be acquired using a computer vision system, e.g., a camera and a gaze detection or eye tracking analysis, at which point a user profile of the requesting user may be obtained. The biometric marker may be compared to a biometric signature in the profile, which may also contain information about the user's preferred content and any restrictions that may have been configured. If the user is part of a group profile, an administrator of the group profile may also be identified and notified of the request for streaming media content, along with a request for access to the streaming media content if necessary. Also included in the user profile may be a list of streaming media content that is permitted for the user. It should be noted that this permissible content need not be an explicit list of content, but inferences may be made from time of day or program rating or other characteristics of the request or streaming media content that is requested to make a decision on whether access to the streaming media content should be granted. In the group profile scenario, there may also be a step of checking that the streaming media content is not explicitly blocked for that user, including the optional step of asking the administrator of the group profile for permission to access the streaming media content. Lastly, access may be granted to the user and the streaming media content may be transmitted to an appropriate device if the streaming media content is allowed.

In an embodiment, if a group of viewers of the streaming media content are detected for a single device, then the system or method may undertake biometric authorization of all the viewers one by one. However, if an administrator were to be identified in the group of viewers related to the profile, then authorization could cease as the administrator would be enough to authenticate the streaming media content. However, if no administrator were found in the viewership, then each viewer would need to be authenticated and individual profiles verified for access to the streaming media content separately.

Figure 2:
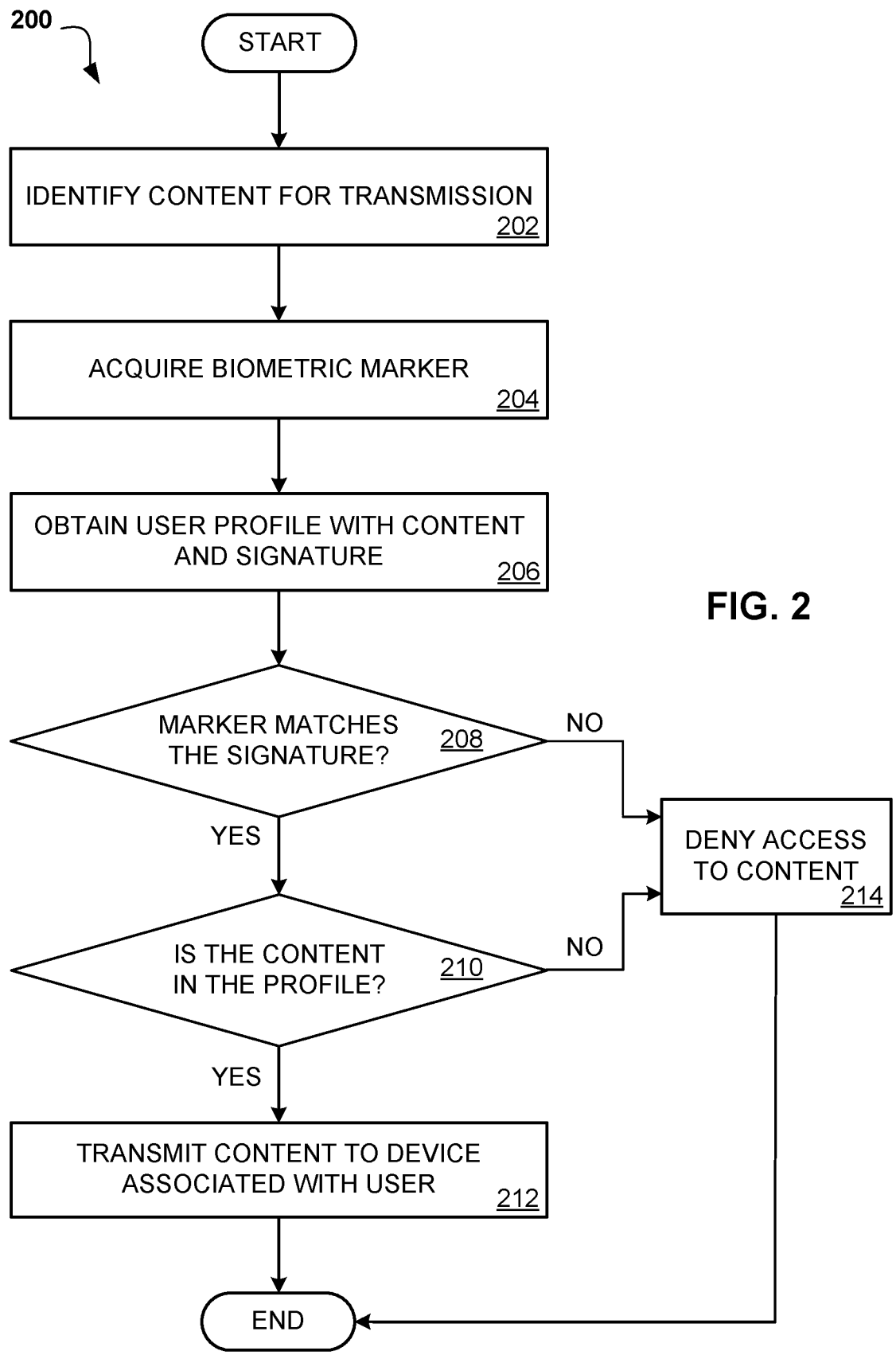
FIG. 2 depicts a flow chart diagram for a process that controls access to streaming media content according to an embodiment.

Referring to FIG. 2, an operational flowchart illustrating a process 200 that controls access to streaming media content. At 202, streaming media content that is present on a remote or local server may be identified for transmission to a user. This step may include a request for specific content that may be made by a user, or the streaming media content may be made by an automated process, such as a recommendation system in use by a streaming provider. For instance, the provider may determine that a television show is similar to content that has been streamed before and present this choice to a user, who may or may not have requested streaming media content at the time. It is not required for a request to be made for specific content to be identified for the purposes described herein, though a specific user is required to be connected to the identified content.

At 204, a biometric marker may be acquired from the user using a computer vision system, e.g., a camera mounted in the space near the user that is able to see and track the eyes of the user. The biometric marker may include specific information unique to a given user that may be collected using known eye tracking or gaze detection techniques. It is not required that the biometric marker be a specific characteristic of the user, other than the fact that the marker is collected from eye movements of the user. Likewise, the computer vision system is not limited to only eye tracking and gaze detection but may use other techniques to obtain the biometric marker. One of ordinary skill in the art may recognize that this process may also be used to generate the biometric signature in a user profile by collecting the marker prior to the authentication process and adding the marker to the profile for a specific user as the biometric signature that may be used later in the authentication process.

It should be noted that all collection of information from a user that may personally identify a human user or is sensitive in any other way requires the informed consent of all people whose information may be collected and analyzed for the purposes described herein. Consent may be obtained in real time or through a prior waiver or other process that informs a subject that their information may be captured by a device or other process and that the information may be used to authenticate users to access streaming media content. This applies for both the collection of the biometric marker at this step and the biometric signature that may be part of the user profile, as described below. The information owner is free to decide at any time to revoke consent for use of sensitive information as these settings are permanently retained to keep the media access control module 150 updated with the latest information and also allow the owner of the information complete control over their informed consent to use sensitive information in the course of the process. The consent described here may also refer to allowing some, or any, data relating to an information owner from being sent to a local server, cloud server or any other location. The owner has complete control on the transmission of information that may be sensitive or personally identify the owner of the information.

At 206, a user profile may be obtained that may include a biometric signature for the user or group and also an indication of permissible content. As described above, the biometric signature may have been collected in the past to positively identify a user. It is not required that this signature be in a specific form, only that the signature be in the same form as the marker so that a comparison may be made. For permissible content, this may include the preferences of the user for streaming media content in the case of an individual user profile and may also connect to the user interest and preference of streaming contents correlated with time-based content, a user schedule, including information about vacation and business trips, a user state of health, content follow-ups and interest, media content rating with or without time-of-day correlation and any other customizable media and gaming profile identification for the user. In the case of a group profile, there may additionally be restrictions applied by an administrator with respect to streaming media content, e.g., certain dates or times when content may be viewed and specific program rating levels that are allowed to be viewed. In addition, the user profile is not required to be connected to any specific device or required to be stored in a specific location. The user profile may be is a global media or gaming profile capable of plugging into any supported device, for example the profile may be accessed from any location, such as a hotel or airport while the user travels for work or vacation.

In an embodiment, a supervised machine learning model may be trained to predict the desires or preferences for a given user or group based on past viewing of streaming media content or restrictions for users within a given group profile that may have been configured by an administrator. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include past viewing sessions by the user, including any users in a group, or may also be based on a program rating that may be connected to the content by the streaming media provider. The training data may also include the schedule information of the user, such as learning that the user is working during certain hours and may not wish to consume certain types of content during those times, perhaps preferring work-related videos to movies or other entertainment options. The training data may be collected from a single example user or group, with user consent required prior to collection of any data from human users, as mentioned above. The prediction results may be stored in a database so that the data is most current, and the output would always be up to date.

At 208, it may be determined whether the biometric marker matches the biometric signature in the user profile. If a match is found, then the process may proceed to step 212 below. If there is no match, or if the user profile does not have a biometric signature, then access to the streaming media content may be denied at step 214. It should be noted that the user to be identified at this step is not required to be the user that wishes to access the content, as this process may also be used to identify an administrator for a group profile. As mentioned above, the biometric marker and biometric signature are acquired with a computer vision system using eye tracking or gaze detection algorithms and are not limited to a specific characteristic of a user within what may be collected using such algorithms.

At 210, it may be determined whether the streaming media content matches the permissible content in the user profile. If a match is found, then the process may proceed to step 212 below but if there is no match, then access to the streaming media content may be denied at step 214. One of ordinary skill in the art will recognize that the streaming media content need not explicitly match what is in the user profile as the process may make inferences, as described with respect to the machine learning model above, as to which streaming media content that a user may want or prefer, or in the case of a group profile, which content the administrator wants to block.

It should also be noted that, prior to denying access to the streaming media content, the process may optionally send a notification to the user, or the administrator in the case of a group profile, to allow the user or administrator to manually override the configuration of the user profile if the user or administrator wishes to allow access to the streaming media content at that time. If a manual override decision is made by the user or administrator, then that decision may be learned by the process and used as feedback to the machine learning model that predicts permissible content for the user profile. The user profile may be updated with this information such that the user profile is always current with the preferences of the user or administrator.

At 212, the streaming media content may be transmitted to the user, given that the user has been positively identified at step 208 and the streaming media content has been deemed permissible at step 210. The streaming media content may be sent over the network to any supported device that may be connected to the user once authentication has been completed.

At 214, as mentioned above, access to the streaming media content may be denied if either of the conditions in steps 208 or 210 are not met. Once access is denied, a notification may be transmitted to the user, such as a text alert on a computer screen or other device that may be attempting to access the streaming media content or else an audible notification may be made to the user indicating that access has been denied to the streaming media content.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling access to streaming media content, the method comprising:
   identifying the streaming media content on a content server for transmission to a user;
   acquiring a biometric marker from the user using a computer vision system, wherein the biometric marker is based on eye movements of the user;
   obtaining a biometric signature and permissible content for the user from a profile on a server, wherein the profile further comprises applied restrictions for identifying the streaming media content to block, and wherein obtaining the permissible content further comprises using a machine learning model to predict the streaming media content to block;
   comparing the biometric marker to the biometric signature for the user and the streaming media content to the permissible content for the user;
   in response to determining that the biometric marker does not match the biometric signature for the user, blocking transmission of the streaming media content to the user; and
   in response to determining that the streaming media content does not match the permissible content for the user, blocking the transmission of the streaming media content to the user.

2. The computer-implemented method of claim 1, further comprising:
   determining that the permissible content for the user is associated with a group profile, wherein the group profile includes an administrator;
   transmitting a prompt to the administrator to approve access to the streaming media content; and
   transmitting the streaming media content to a device when the administrator approves, wherein the device is associated with the user.

3. The computer-implemented method of claim 1, wherein a machine learning model that predicts desired streaming media content based on personal characteristics and content specifications is used to determine the permissible content for the user.

4. The computer-implemented method of claim 1, wherein the computer vision system uses eye tracking and gaze detection algorithms to acquire the biometric marker.

5. The computer-implemented method of claim 1, wherein the biometric signature cannot be obtained for the user, further comprising:
   acquiring the biometric marker from the user using the computer vision system; and
   adding the biometric marker to the profile for the user as the biometric signature.

6. A computer system for controlling access to streaming media content, the computer system comprising:
   one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is capable of performing a method comprising:
   identifying the streaming media content on a content server for transmission to a user;
   acquiring a biometric marker from the user using a computer vision system, wherein the biometric marker is based on eye movements of the user;
   obtaining a biometric signature and permissible content for the user from a profile on a server, wherein the profile further comprises applied restrictions for identifying the streaming media content to block, and wherein obtaining the permissible content further comprises using a machine learning model to predict the streaming media content to block;
   comparing the biometric marker to the biometric signature for the user and the streaming media content to the permissible content for the user;
   in response to determining that the biometric marker does not match the biometric signature for the user or that the streaming media content does not match the permissible content for the user, blocking transmission of the streaming media content to the user; and
   in response to determining that the streaming media content does not match the permissible content for the user, blocking the transmission of the streaming media content to the user.

7. The computer system of claim 6, further comprising:
   determining that the permissible content for the user is associated with a group profile, wherein the group profile includes an administrator;
   transmitting a prompt to the administrator to approve access to the streaming media content; and
   transmitting the streaming media content to a device when the administrator approves, wherein the device is associated with the user.

8. The computer system of claim 6, wherein a machine learning model that predicts desired streaming media content based on personal characteristics and content specifications is used to determine the permissible content for the user.

9. The computer system of claim 6, wherein the computer vision system uses eye tracking and gaze detection algorithms to acquire the biometric marker.

10. The computer system of claim 6, wherein the biometric signature cannot be obtained for the user, further comprising:
   acquiring the biometric marker from the user using the computer vision system; and
   adding the biometric marker to the profile for the user as the biometric signature.

11. A computer program product for controlling access to streaming media content, the computer program product comprising:
   a computer-readable storage medium having program instructions embodied therewith, the program instructions executable by a processor to cause the processor to perform a method comprising:
   identifying the streaming media content on a content server for transmission to a user;
   acquiring a biometric marker from the user using a computer vision system, wherein the biometric marker is based on eye movements of the user;

obtaining a biometric signature and permissible content for the user from a profile on a server, wherein the profile further comprises applied restrictions for identifying the streaming media content to block, and wherein obtaining the permissible content further comprises using a machine learning model to predict the streaming media content to block;

comparing the biometric marker to the biometric signature for the user and the streaming media content to the permissible content for the user;

in response to determining that the biometric marker does not match the biometric signature for the user, blocking transmission of the streaming media content to the user; and in response to determining that the streaming media content does not match the permissible content for the user, blocking the transmission of the streaming media content to the user.

12. The computer program product of claim 11, further comprising:

determining that the permissible content for the user is associated with a group profile, wherein the group profile includes an administrator;

transmitting a prompt to the administrator to approve access to the streaming media content; and transmitting the streaming media content to a device when the administrator approves, wherein the device is associated with the user.

13. The computer program product of claim 11, wherein a machine learning model that predicts desired streaming media content based on personal characteristics and content specifications is used to determine the permissible content for the user.

14. The computer program product of claim 11, wherein the computer vision system uses eye tracking and gaze detection algorithms to acquire the biometric marker.

15. The computer program product of claim 11, wherein the biometric signature cannot be obtained for the user, further comprising:

acquiring the biometric marker from the user using the computer vision system; and adding the biometric marker to the profile for the user as the biometric signature.

* * * * *